(12) United States Patent
Maucher

(10) Patent No.: US 8,403,765 B2
(45) Date of Patent: Mar. 26, 2013

(54) CLEARANCE-FREE CONSTANT VELOCITY UNIVERSAL JOINT

(75) Inventor: Stephan Maucher, Siegburg (DE)

(73) Assignee: GKN Driveline International GmbH, Lohmar (DE)

( * ) Notice: Subject to any disclaimer, the term of this patent is extended or adjusted under 35 U.S.C. 154(b) by 123 days.

(21) Appl. No.: 12/865,361

(22) PCT Filed: Jan. 29, 2008

(86) PCT No.: PCT/EP2008/000668
§ 371 (c)(1),
(2), (4) Date: Jul. 29, 2010

(87) PCT Pub. No.: WO2009/095030
PCT Pub. Date: Aug. 6, 2009

(65) Prior Publication Data
US 2010/0311509 A1   Dec. 9, 2010

(51) Int. Cl.
*F16D 3/223*   (2011.01)
(52) U.S. Cl. .......................... 464/145; 464/906
(58) Field of Classification Search .............. 464/139, 464/141–143, 145, 169, 906
See application file for complete search history.

(56) References Cited

U.S. PATENT DOCUMENTS

| | | | | |
|---|---|---|---|---|
| 1,985,278 | A * | 12/1934 | Bradley | 464/145 |
| 2,010,899 | A * | 8/1935 | Rzeppa | 464/145 |
| 2,182,455 | A * | 12/1939 | Smith | 464/145 |
| 3,069,874 | A * | 12/1962 | Leto | 464/140 |
| 3,310,961 | A * | 3/1967 | Ristau | 464/906 |
| 4,464,143 | A * | 8/1984 | Bowyer | 464/906 |
| 6,350,202 | B1 * | 2/2002 | Jacob et al. | 464/145 |
| 6,733,395 | B2 * | 5/2004 | Thomas et al. | 464/906 |

FOREIGN PATENT DOCUMENTS

| | | |
|---|---|---|
| DE | 26 57 821 B1 | 5/1978 |
| DE | 10 2006 016842 A1 | 10/2007 |
| DE | 102006016842 * | 10/2007 |
| GB | 2 331 572 A | 5/1999 |

OTHER PUBLICATIONS

PCT International Search Report for PCT/EP2008/000668 dated Oct. 29, 2008.

* cited by examiner

*Primary Examiner* — Gregory Binda
*Assistant Examiner* — Josh Skroupa
(74) *Attorney, Agent, or Firm* — Rader, Fishman & Grauer, PLLC

(57) ABSTRACT

A constant velocity universal joint is disclosed that comprises an outer joint part, an inner joint part, torque transmitting balls, an annular ball cage, and a supporting mechanism. The outer joint part includes circumferentially distributed outer ball tracks. The inner joint part includes circumferentially distributed inner ball tracks. The torque transmitting balls are guided in pairs of tracks, wherein each track includes an outer ball track and an inner ball track. When the joint is in the aligned condition, the pairs of tracks, at least in a central joint plane, widen in coinciding axial directions. The annular ball cage is defined by a cage axis. The cage is positioned between the outer joint part and the inner joint part and comprises circumferentially distributed windows in which the torque transmitting balls are held with a clearance. The ball cage comprises an axial clearance relative to the outer joint part. The supporting resiliently supports the ball cage relative to the outer joint part and acts on the ball cage in the direction opposed to the direction in which the pairs of tracks widen. The supporting mechanism comprises a carrier element connected to the ball cage and a separate supporting member, wherein the supporting member is resiliently supported on the carrier element and rests against the outer joint part.

19 Claims, 2 Drawing Sheets

CLEARANCE-FREE CONSTANT VELOCITY UNIVERSAL JOINT

TECHNICAL FIELD

The disclosure relates to a constant velocity universal joint with a resilient supporting mechanism for a ball cage.

BACKGROUND

From DE 10 2006 016 842 A1 there is known a constant velocity universal joint wherein the ball cage is pretensioned by a supporting means relative to the outer joint part. A first embodiment thereof comprises supporting means in the form of a bowl-shaped cover which is attached to the ball cage and which is acted upon by the outer joint part. According to a second embodiment it is proposed that a journal is guided in the outer joint part so as to extend coaxially relative to its longitudinal axis and so as to be resiliently supported, which journal rests against the cover and acts on same.

DT 25 22 670 A proposes a similar constant velocity universal joint wherein the ball cage is supported relative to the outer joint part. For supporting and guiding the ball cage there is provided a dish-shaped element which is supported on a layer of plastics. The layer of plastics can be designed so as to be resilient relative to the clearance setting.

From U.S. Pat. No. 5,823,883 there is also known a constant velocity universal joint. The ball cage comprises a spherical portion which is adapted to the spherical inner face of the joint base. Furthermore, the ball cage comprises a spring portion which is arranged between the inner joint part and the spherical inner face of the joint base. The spring portion applies an axial force to the inner joint part to compensate for production tolerances.

When the above-mentioned constant velocity universal joints are in the articulated condition, the geometric conditions can cause a change in the pretensioning force acting on the ball cage, which can lead to an undesirable increase in the drag moment.

SUMMARY

A constant velocity universal joint is disclosed comprising an outer joint part, an inner joint part, torque transmitting balls, an annular ball cage, and a supporting mechanism. The outer joint part includes circumferentially distributed outer ball tracks. The inner joint part includes circumferentially distributed inner ball tracks. The torque transmitting balls are guided in pairs of tracks, each pair including an outer ball track and an inner ball track. When the joint is in an aligned condition, the pairs of tracks, at least in a central joint plane, widen in coinciding axial directions. The annular ball cage is defined by a cage axis. The cage is positioned between the outer joint part and the inner joint part and comprises circumferentially distributed windows in which the torque transmitting balls are held with a clearance. The ball cage further comprises an axial clearance relative to the outer joint part. The supporting mechanism resiliently supports the ball cage relative to the outer joint part. The supporting mechanism acts on the ball cage in the direction which is opposed to the direction in which the pairs of tracks widen. Further, the supporting mechanism comprises a carrier element connected to the ball cage and a separate supporting member, wherein the supporting member is resiliently supported on the carrier element and abuts against the outer joint part.

The inventive constant velocity universal joint is advantageous in that it generates a design-related pretensioning force which acts on the ball cage. As the supporting member is attached to, and resiliently supported relative to, the carrier element which is connected to the ball cage, the supporting member follows the pivot movement of the ball cage. More particularly, when the joint is articulated, this leads to the pretensioning force being advantageously introduced into the ball cage and thus to a lower drag moment when the joint is articulated. The pairs of tracks preferably widen towards the joint base, so that the pretensioning force acts against the urge of the ball cage to move towards the joint base when torque is being transmitted.

According to one exemplary embodiment, it is proposed that the supporting mechanism is designed in such a way that the region of contact between the supporting member and the outer joint part is positioned on the cage axis of the ball cage. "Region of contact" in this context refers to the contact between the supporting member and the contact face of the joint base, which contact is preferably a point contact or surface contact with a minimum area of contact. In geometrical terms this means that the distance between the region of contact and the joint center is preferably greater than or equal to the radius of the ball cage, with the joint center being defined as the point of intersection between a longitudinal axis of the outer joint part and a longitudinal axis of the inner joint part when the joint is articulated. The advantageous effect of this arrangement is that there is ensured an adequate articulation angle.

According to a first embodiment, the supporting mechanism, in addition to the carrier element and the supporting member, comprises a separate spring element which is supported on the carrier element and resiliently loads the supporting member towards the outer joint part. In one exemplary configuration, the spring element is provided in the form of a helical spring, which is advantageous in that, by selecting the helical spring specifically, the characteristic spring curve can be adapted to the joint requirements. With production-related component tolerances and also when changes in geometry occur due to any clearance being offset, a flat characteristic spring curve of the helical spring ensures a constant pretensioning force. However, the use of other spring elements is also conceivable, for example of one or more plate springs, preferably with a flat characteristic spring curve.

In one exemplary configuration, the supporting member is provided in the form of a journal which, more particularly, comprises a conical or tapered supporting face, which is supported against the spherical inner face of the outer joint part. The conical or spherical supporting face is advantageous in that the region of contact relative to the contact face of the joint base is minimized so that the friction forces are minimized in turn, and a specific introduction of force can take place. Furthermore, it is advantageous if the supporting member comprises a shoulder which supports the spring element provided, more particularly, in the form of a helical spring. The spring element is arranged coaxially relative to the supporting member. However, in principle, other shapes of supporting members are also conceivable, for instance a supporting member in the form of a ball member.

In one exemplary configuration, the carrier element is bowl-shaped and comprises a recess for receiving the supporting member and the spring element. More particularly, in one arrangement, the recess is provided in the form of a cup portion which comprises a base and a cylindrical wall, with the base serving to support the spring element. It is regarded as being advantageous that the coaxial arrangement of the supporting member and of the spring element combined with said two components being received in the recess in the carrier element results in a short axial length of the supporting means. However, it is also conceivable for the spring element and the supporting element to be arranged one behind the other in the recess of the carrier element.

According to a second embodiment, the supporting member is provided in the form of a resilient spring element, in which case the supporting member and the spring element are produced in one piece and form a component which has a supporting function and a spring function. In one exemplary arrangement, the resilient supporting member is preferably provided in the form of a journal, but other embodiments such as a spherical shape are not excluded. The resilient material for the supporting member can be plastics or rubber for example. The carrier element may be provided in the form as described above. More particularly, in one exemplary arrangement, the carrier element is bowl-shaped and comprises a recess for receiving the resilient supporting member, which recess has the shape of a cup. The advantage of the present embodiment comprising an integral supporting spring member refers to the small number of parts and a short axial length.

In both the above-mentioned embodiments the supporting mechanism preferably extends symmetrically relative to the cage axis. Furthermore, in exemplary configuration, the outer joint part comprises a base with a spherical inner face, wherein the outer joint part and the base may be produced in one piece. However, the outer joint part and the joint base can, initially, be produced as separate components which, subsequently, are firmly connected to one another. The center of the spherical inner face is located on the longitudinal axis of the outer joint part, wherein the radius of the spherical inner face around said center is preferably identical to or smaller than the distance of the joint center from the point of contact between the supporting member and the joint base. If the center of the spherical inner face is located in the joint center, the pretensioning force acting on the ball cage when the joint is articulated is approximately constant in every angular position. If the distance between the center of the spherical inner face and the joint base is smaller than the distance between the point of contact and the joint center, an increasing articulation angle of the joint also results in an increase in the pretensioning force acting on the ball cage. This can be advantageous for certain applications. On the other hand, it is also conceivable for the distance between the center of the spherical inner face and the joint base to be greater than the distance between the point of contact and the joint center, in which case the pretensioning force acting on the ball cage decreases with an increasing articulation angle.

BRIEF DESCRIPTION OF THE DRAWINGS

Exemplary embodiments of the disclosure are illustrated in the drawings and will be described below.

DETAILED DESCRIPTION

Figure 1:
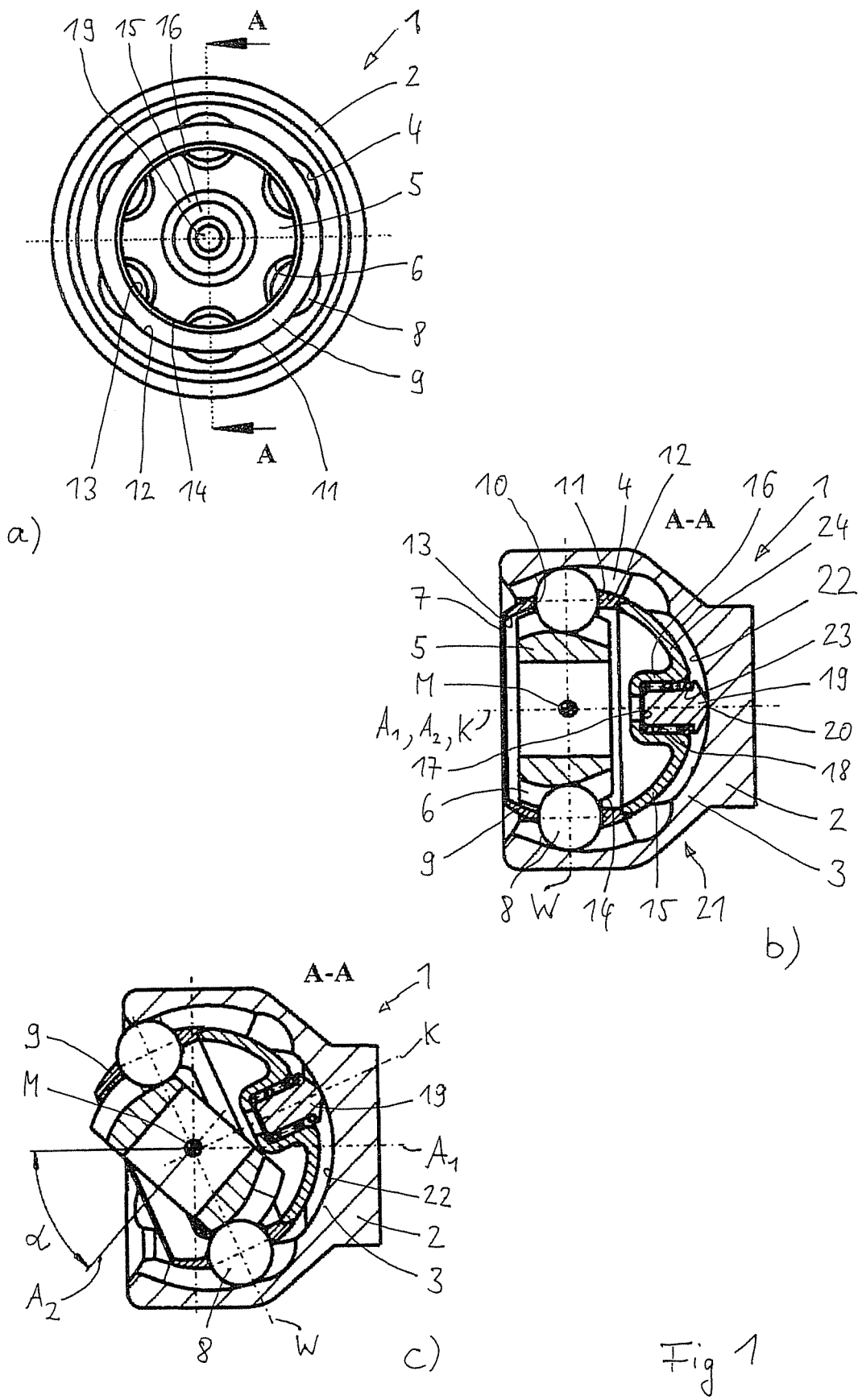
FIG. 1 shows an inventive constant velocity universal joint in a first embodiment, wherein:
a) is in an axial view in the aligned position;
b) is in a longitudinal section along sectional line A-A of FIG. 1a in the aligned position;
c) is in a longitudinal section along sectional line A-A of FIG. 1a in an articulated position.

FIG. 1 shows a constant velocity universal 1 in a monoblock design wherein a base 3 is integrally formed onto an outer joint part 2. The base 3 forms a spherical inner face 22 with a surface center in the joint center M. Longitudinally extending, circumferentially distributed outer ball tracks 4 are formed into the outer joint part 2. Furthermore, the joint 1 comprises an inner joint part 5 into which it is possible to insert a driveshaft for torque transmitting purposes (not illustrated). Longitudinally extending, circumferentially distributed inner ball tracks 6 are formed into the inner joint part 5. Outer ball tracks 4 and inner ball tracks 6, which are associated with one another, form pairs of tracks which widen in the central joint plane from the aperture 7 towards the base 3 of the outer joint part 2.

In each pair of tracks, wherein each pair includes an outer ball track 4 and an inner ball track 6, there is received a torque transmitting ball 8. The balls 8 are held by an annular ball cage 9 which is arranged between the outer joint part 2 and the inner joint part 5, with their ball centers being held on the angle-bisecting plane W when the joint is in the articulated position. The balls 8 are held with an axial clearance in the circumferentially distributed cage windows 10 in the ball cage 9. The ball cage 9 comprises a spherical outer face 11 which is provided with an axial clearance relative to an inner spherical guiding face 12 of the outer joint part. The spherical inner face 13 of the ball cage 9 is substantially clearance-free relative to a spherical outer face 14 of the inner joint part 5.

At the ball cage 9, there is attached a supporting mechanism 21 which points towards the joint base 3, i.e. in the direction in which the pairs of tracks widen. The supporting mechanism 21 comprises an especially bowl-shaped carrier element 15, a supporting member 19 which is held at, and supported relative to, the carrier element 15, as well as a spring element 18 which resiliently loads the supporting member 19 towards the joint base 3. The carrier element 15 comprises a bowl portion 24 and a central cup portion 16, with the cup portion 16 forming a recess 16 which is open towards the joint base 3. The cup portion 16 comprises a base 17 which supports the spring element 18.

In one exemplary embodiment, the spring element 18 is provided in the form of a helical spring 18 which is arranged with a small radial clearance in the recess 16. The supporting member 19 may be provided in the form of a journal 19 which is arranged coaxially relative to the recess 16 in the helical spring 18. The journal 19 comprises a radially outwardly projecting annular shoulder 23 which supports the helical spring 18, so that the journal 19 is loaded towards the joint base 3. The journal 19 retains an adequate axial freedom of movement relative to the base 17 of the cup portion 16, so that even with a greater amount of clearance, the journal 19 is always pretensioned. Furthermore, the journal 19 comprises an end portion 20 whose point is in contact with the base 3 of the outer joint part. The tapered end portion 20 which can also be spherical or conical is advantageous in that the size of the contact face relative to the joint base is minimized, so that the friction forces are low and so that there takes place a defined introduction of force into the ball cage 9.

The supporting mechanism 21 is designed in such a way that the helical spring 18 is pretensioned in the mounted condition and introduces via the journal 19 into the ball cage 9 a pretensioning force which acts coaxially relative so the cage axis K. As a result, the ball cage 9 is loaded and displaced towards the aperture 7 in the outer joint part 2. On their sides facing away from the aperture 7, the balls 8 are supported in the cage windows 10 and, as a result, are pressed towards the aperture 7, i.e. in the direction in which the pairs of tracks are tapered, and come to rest against the outer ball tracks 4. The ball cage 9, by means of its spherical inner face 13, is axially supported in a largely clearance-free way on the spherical outer face 14 of the inner joint part 5. Furthermore, the spherical outer face 11 of the ball cage 9 comprises an axial clearance relative to the inner spherical face 12 of the outer joint part 2. As a result of this design, the joint 1 is clearance-free overall, i.e. more particularly, it does not comprise any undesirable rotational clearance, which applies both to the unarticulated and to the articulated joint 1.

FIG. 1c shows the constant velocity universal joint in an articulated condition, i.e. the longitudinal axis $A_1$ and the longitudinal axis $A_2$ extend at an articulation angle α relative to one another, with the balls 8 with their ball centres and the ball cage 9 being held in the angle bisecting plane W. The point of contact between the journal 19 and the outer joint part 2 is located on the cage axis K of the ball cage 9 and moves on the base 3 in the outer joint part 2, which base 3 is arranged spherically around the joint center M. There is thus achieved a pretensioning forces acting on the ball cage 9, which pretensioning force always extends in the same direction with reference to the cage axis K of the ball cage 9. The amount of pretensioning force does not change when the joint is articulated because the surface center of the spherical inner face 22 is positioned in the joint center M. Furthermore, the pretensioning force generates the same flow of force in the joint components as in the unarticulated joint 1, so that a clearance-free condition is achieved.

If the surface center of the spherical inner face 22 is located on the joint centre M, the drag moment of the joint remains constant when the joint is articulated because the amount of the pretensioning force remains constant and always acts on the cage axis K of the ball cage 9. As a result, the pretensioning force passes through the joint center M and, with reference of the cage axis K, acts in the form of an axial force on the ball cage 9. The torque transmitting balls 8 are thus guided on the angle-bisecting plane W entirely as a result of control forces inside the joint, thus generating optimum joint properties.

Figure 2:
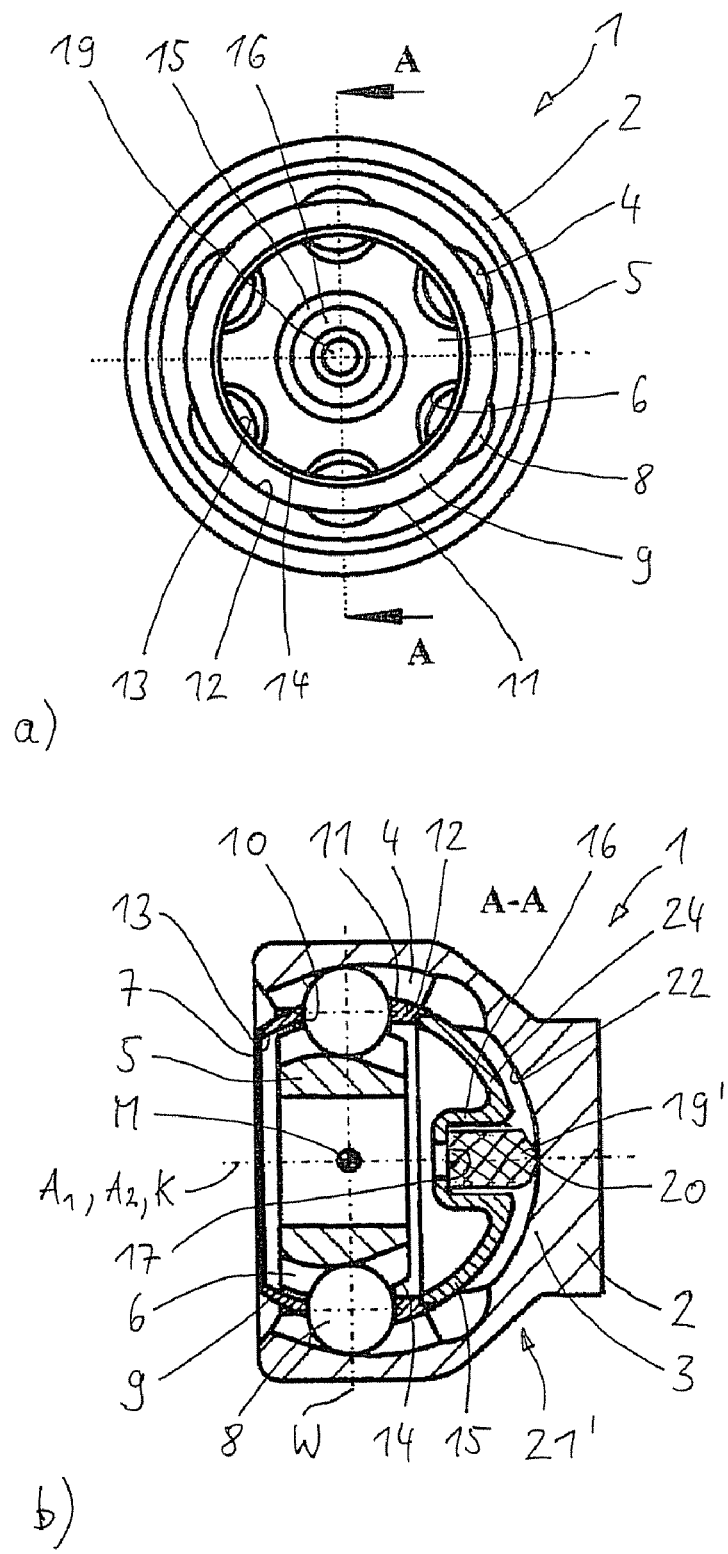
FIG. 2 shows an inventive constant velocity universal joint in a second embodiment, wherein:
a) is in an axial view in the aligned position,
b) is in a longitudinal section along sectional line A-A of FIG. 2a in the aligned position.

FIG. 2 shows a constant velocity universal joint 1 in a second embodiment which largely corresponds to that shown in FIG. 1. To that extent, as far as the properties which the two embodiments have in common are concerned, reference is made to the above description, with identical components having been given the same reference numbers and with the reference numbers of modified components having been provided with an apostrophe. In the embodiment according to FIG. 2, in contrast to that shown in FIG. 1, the supporting mechanism 21' comprises a supporting member 19' which is produced so as to be integral with the resilient spring element. The supporting member 19,' which can also be referred to as a supporting spring member, is held at, and supported relative to, the carrier element 15. In the present embodiment, too, the carrier element 15 comprises a bowl-shaped portion 24 and a central cup-shaped portion 16 which comprises a recess 16 which is open towards the joint base 3. The resilient supporting member 19' is arranged in the cup-shaped portion 16 with a small amount of radial clearance and is supported against the base 17 of the cup-shaped portion 16. It can be seen that the resilient supporting member 19' is provided in the form of a journal, but other shapes are not excluded. The journal comprises a conical end portion 20 which is in contact with the base 3 of the outer joint part 2. The supporting mechanism 21' is designed in such a way that, in the mounted condition, the resilient supporting member 19' is under pretension and introduces a pretensioning force into the ball cage 9 which extends coaxially relative to the cage axis K.

The two inventive embodiments are advantageous in that the pretension for providing a clearance-free joint is achieved by a spring element or an integrated supporting spring member which is effectively used between the outer joint part and the ball cage, with the design being such that, when the joint is articulated, the pretension always acts towards the cage axis. In this way, undesirable drag moments in the joint, as well as a rotational backlash, are minimized.

What is claimed is:

1. A constant velocity universal joint comprising:
    an outer joint part with circumferentially distributed outer ball tracks;
    an inner joint part with circumferentially distributed inner ball tracks;
    torque transmitting balls which are guided in pairs of tracks, each pair including an outer ball track and an inner ball track, wherein, when the joint is in an aligned condition, the pairs of tracks, at least in a central joint plane, widen in coinciding axial directions;
    an annular ball cage with a cage axis, which is positioned between the outer joint part and the inner joint part and which comprises circumferentially distributed windows in which the torque transmitting balls are held with a clearance, wherein the ball cage comprises an axial clearance relative to the outer joint part; and
    a supporting mechanism for resiliently supporting the ball cage relative to the outer joint part, wherein the supporting mechanism acts on the ball cage in a direction which is opposed to the direction in which the pairs of tracks widen,
    wherein the supporting mechanism comprises a carrier element connected to the ball cage and a separate supporting member, wherein the supporting member is connected to the carrier element so as to jointly articulate with said carrier element, and the supporting member is resiliently supported on the carrier element and abuts the outer joint part.

2. A constant velocity universal joint according to claim 1, wherein the supporting mechanism is designed such that a contact which exists between the supporting member and the outer joint part is located on the cage axis of the ball cage.

3. A constant velocity universal joint according to claim 2, wherein a joint center is defined as a point of intersection of a longitudinal axis of the outer joint part and a longitudinal axis of the inner joint part when the constant velocity universal joint is in an articulated condition, wherein the distance of the joint center from the contact between the supporting member and the outer joint part is greater than or equal to the radius of the ball cage.

4. A constant velocity universal joint according to claim 1, wherein the supporting member is provided in the form of a spring element.

5. A constant velocity universal joint according to claim 1, wherein the supporting mechanism comprises at least one spring element which resiliently loads the supporting member towards the outer joint part.

6. A constant velocity universal joint according to claim 5, wherein the spring element is provided in the form of a helical spring.

7. A constant velocity universal joint according to claim 5, wherein the supporting member comprises a shoulder which supports the spring element.

8. A constant velocity universal joint according to claim 6, wherein the supporting member comprises a shoulder which supports the spring element.

9. A constant velocity universal joint according to claim 1, wherein the supporting member is provided in the form of a journal.

10. A constant velocity universal joint according to claim 1, wherein the carrier element is bowl-shaped.

11. A constant velocity joint according to claim 1, wherein the carrier element comprises a recess in which the supporting member is received.

12. A constant velocity universal joint according to claim 1, wherein the carrier element comprises a cup-shaped portion with a base on which the supporting member is at least indirectly supported.

13. A constant velocity universal joint according to claim 1, wherein the supporting mechanism is designed symmetrically relative to the cage axis.

14. A constant velocity universal joint according to claim 1, wherein the outer joint part comprises a base with a spherical inner face.

15. A constant velocity universal joint according to claim 14, wherein a center of the spherical inner face is located on a longitudinal axis of the outer joint part at a distance from the base, which distance is smaller than or equal to the distance between a joint center and a contact between the supporting member and said spherical inner face.

16. A constant velocity universal joint according to claim 1, wherein the outer joint part comprises a base, and the pairs of tracks widen towards the base of the joint.

17. A constant velocity universal joint according to claim 1, wherein the annular ball cage presses the torque transmitting balls in the direction in which the pairs of tracks are tapered, thereby pressing the torque transmitting balls against the outer ball tracks.

18. A constant velocity universal joint according to claim 1, wherein when the joint is in an aligned condition, the outer tracks contact their respective torque transmitting balls at respective first tangents, and the inner tracks contact their respective torque transmitting balls at respective second tangents, wherein the first and second tangents of each pair of ball tracks widen in the coinciding axial directions.

19. A constant velocity universal joint according to claim 1, wherein the supporting member is resiliently axially supported on the carrier element.

* * * * *